United States Patent [19]
Feess et al.

[11] 3,857,676
[45] Dec. 31, 1974

[54] PROCESS FOR THE PRINTING AND CONTINUOUS FIXING OF DISPERSE DYESTUFFS ON POLYESTER, CELLULOSE-TRIACETATE, CELLULOSE-2½-ACETATE AND MIXTURES THEREOF

[75] Inventors: Erich Feess, Lorsbach, Taunus; Kurt Roth, Hofheim, Taunus; Günther Trapp, Frankfurt, Main, all of Germany

[73] Assignee: Farbwerke Hoechst Aktiengesellschaft vormals Meister Lucius & Bruning, Frankfurt, Main, Germany

[22] Filed: June 30, 1972

[21] Appl. No.: 267,960

[30] Foreign Application Priority Data
July 3, 1971   Germany............................ 2133161

[52] U.S. Cl................................. 8/21, 8/93, 8/173, 8/24, 8/62
[51] Int. Cl............................................ D06p 1/82
[58] Field of Search.................. 8/93, 173, 62, 21 C

[56] References Cited
UNITED STATES PATENTS
3,478,376  11/1969  Daueble................................ 8/93 X
3,706,525  12/1972  Blackwell.............................. 8/173

*Primary Examiner*—Donald Levy
*Attorney, Agent, or Firm*—Curtis, Morris & Safford

[57] ABSTRACT

A process for printing and continuously fixing prints of disperse dyestuffs on fibrous materials of polyester, cellulose-triacetate and cellulose-2½-acetate and mixtures thereof or mixtures with wool, natural or regenerated cellulose fibers or with other synthetic fibers, wherein compounds of the formula (1)

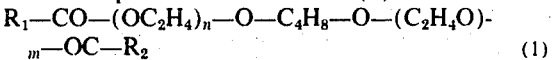

wherein $R_1$—CO— and $R_2$—CO— each represents the acyl radicals of linear or branched alkane- or alkene monocarboxylic acids with from 12 to 22 carbon atoms and $n$ and $m$ each is a number of from 4 to 12, alone, or in combination with oxethylated naphtols of the formula (2)

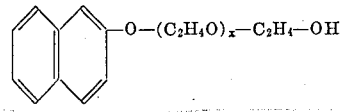

(2)

wherein $x$ is zero or a number of from 1 to 4, are used as fixing auxiliaries.

The prints which are prepared by using these fixing auxiliaries are distinguished by a good to excellent dyestuff yield with brilliant shades, they have a good to very good fastness to light and to use required for textile materials. Furthermore, the fixing auxiliaries facilitate the elimination of the carriers also used by their emulsifying properties in the usual after-treatments of dyeings and prints by rinsing, so that the shades are protected from being spoiled and the fastness to light is increased.

8 Claims, No Drawings

PROCESS FOR THE PRINTING AND CONTINUOUS FIXING OF DISPERSE DYESTUFFS ON POLYESTER, CELLULOSE-TRIACETATE, CELLULOSE-2½-ACETATE AND MIXTURES THEREOF

The present invention relates to a process for the printing and continuous fixing of disperse dyestuffs on polyester, cellulose-tricacetate, cellulose-2½-acetate and mixtures thereof.

The continuous fixing of disperse dyestuffs on polyester, cellulose-triacetate and cellulose-hemi-penta-acetate and mixtures thereof is carried out either with hot air at a temperature of from 180° to 200°C or with saturated steam of from about 102° to 105°C. It proved to be advantageous, in all cases, to add determined accelerating agents for the fixation, called carriers, which allow a better dyestuff fixation. These carriers are especially used in the thermofixation and the steaming at high temperatures, but it had recently appeared that also in the steaming with saturated steam, especially on hemi-penta-acetate, higher dyestuff yields can be obtained by the addition of carriers.

In addition to the carriers on the basis of hydroxydiphenyl, methylnaphtalene, benzoic acid or salicylic acid alkyl esters or oxethylation products of alkyl phenols all surface-active esterification products of carboxylic acids with high-molecular polyglycols generally used for synthetic fibers, such as they are described in German Auslegeschrift No. 1,138,735, may be used as fixing auxiliary agents, and, furthermore, alkylation products of fatty acids, fatty acid mono-esters or fatty amines according to German Pat. No. 1,184,730, the fatty acids having been condensated in a molar ratio of 1 : 1 with butandiol-(1,4)-pentaglycol ethers.

These carriers, most of which have, so far, only been used as fixing auxiliaries for dyeings and which proved to be inadequate for prints, have, however, drawbacks. On the one hand, they can soil the dyeings as they can themselves be washed out of the fibrous material with difficulties and to a limited extent only, and, on the other hand, the prints so obtained have, in general, no good fastness to light.

Now, it was found, that all these drawbacks can be overcome when the fixation of prints with disperse dyes on fibrous materials of polyester, cellulose-triacetate and cellulose hemi-penta acetate or mixtures thereof or their mixtures with wool, natural or regenerated cellulose fibers or with other synthetic fibers, is effected with the use of fixing agents which are of the general formula $$R_1-CO-(OC_2H_4)_n-O-C_4H_8-O-(C_2H_4O)_m-OC-R_2 \qquad (1)$$

wherein $R_1-CO-$ and $R_2-CO-$ each represents the acyl radicals of linear or branched alkane- or alkenemonocarboxylic acids having from 12 to 22 carbon atoms, preferably from 16 to 20, and $n$ and $m$ each is an integer of from 4 to 12, preferably from 6 to 9.

It was also found that the products corresponding to formula (1) can be used as fixing auxiliaries for the above-mentioned purposes not only alone, but that in combination with oxethylated naphtols of the general formula (2)

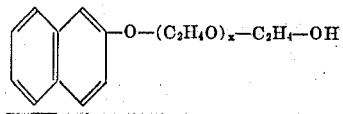

(2)

wherein $x$ is zero or an integer from 1 to 4, their properties as fixation auxiliaries for prints with disperse dyestuffs can still be improved, although the compounds of formula (2) yield unfavourable dyeings of mean fastness to light, as it has been mentioned above, when being used alone as fixing auxiliaries.

The combination with compounds of formula (1), however, yields mixtures of fixing auxiliaries by which optimum dyestuff yields and brilliant shades of the prints can be obtained without perceptible deterioration of the fastness to light as it has been the case with the carriers used until now. The good dispersing effect of the compounds of formula (1) favours the carrier effect of the compounds of formula (2) which are easily washed out of the fiber after fixation in the following usual after-treatment baths. If the compounds of formula (1) are not used additionally, the oxethylated naphtols cannot be eliminated, or only to a limited extent, during the aftertreatment, so that the prints obtained have a meaner fastness to light and, in some cases, do not show the brilliance of shade desired.

The compounds of the invention of formula (1) can be prepared, for example, by esterification of 1 mol of an oxethylation product of butandiol-(1,4) and from 8 to 24 mols of ethylene oxide, preferably from 12 to 18 mols of ethylene oxide with 2 mols of a linear or branched alkane- or alkenemonocarboxylic acid having from 12 to 22 carbon atoms, preferably from 16 to 20. Mixtures of the said carboxylic acids may, of course, also be used for the esterification of the oxethylation product. The compounds of formula (1) added as fixing agents to the printing pastes, or their mixtures with compounds of formula (2) are contained in amounts of from 25 to 60 grams per kilogram of printing paste, preferably from 35 to 50 grams.

The material to be printed is textile material, for example, woven or knitted fabric, fiber fleeces and others, which consist of or contain cellulose-hemi-pentaacetate, cellulose triacetate and high-molecular, linear polyesters, preferably of polyethylene terephtalate fibers. There may be used fiber mixtures of polyethylene terephtalate fibers with wool, fibers of natural or regenerated cellulose or with other synthetical fibers, such as polyamides or polyacrylonitrile.

These fibrous materials are preferably printed with products generally known under the name of disperse dyestuffs, for example those selected from the class of the azo or anthraquinone dyestuffs or those of the quinophthalone type.

The dyestuff fixation is carried out in usual manner by hot air, at from 170° to 220°C or by saturated steam, at from 100° to 110°C or by hot steam at a temperature within the range of from 140° to 190°C.

The use of compounds of formula (1), alone or in combination with oxethylated naphtols of formula (2) allows, besides a continuous fixation of prints, with disperse dyestuffs on polyester and cellulose-2½-acetate fibrous materials, for example by saturated steam, also their fixation on cellulose triacetate fibrous materials. All three types of the fibers or their mixtures may, thus, be printed with one and the same printing paste mixture which certainly is an advantage for the operational technique.

The prints which are prepared by using the fixing auxiliaries mentioned above are distinguished by a good to excellent dyestuff yield with brilliant shades, they have a good to very good fastness to light and to use required for textile materials. Furthermore, the fixing auxiliaries to be used in accordance with the invention facilitate the elimination of the carriers also used by their emulsifying properties in the usual after-treatments of dyeings and prints by rinsing, so that the shades are protected from being spoiled and the fastness to light is increased.

The following examples illustrate the invention, the parts and percentages being by weight, unless stated otherwise.

EXAMPLE 1

The dyestuff of this Example is taught in German Offenlegungsschrift 1,544,451 in Example 1.

30 g of the disperse dyestuff of formula

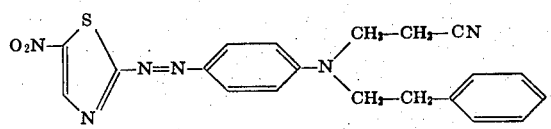

were first pasted with
100 g of cold water and then dispersed with
330 g of boiling water. This dispersion was introduced via a sieve into
500 g of a stock thickening which consisted of a mixture of
  750 g of a 13% aqueous locust-flour thickening,
  202 g of a 10% aqueous sodium alginate thickening,
  48 g of an aqueous solution of 15 g of m-nitrobenzene-sulfonic acid sodium and 3 g of monosodium phosphate, and was filled up to 1 kg with water.
Then,
  40 g of butandiol-(1,4)-pentadecaglycolether-dioleylester were introduced while stirring.

With the above-mentioned printing paste, a knitted fabric from textured polyethylene terephtalate fibers was printed, dried and steamed at 180°C for 8 minutes in a high-temperature steaming apparatus for the fixation of the dyestuff. Finally, the material was rinsed and soaped as usual.

A brilliant violet print was obtained in a high yield having a good fastness to light and wet processing.

EXAMPLE 2

The dyestuff of this example is taught in U.S. Pat. No. 3,367,937 in Example 2.

40 g of a powdery disperse dyestuff of the formula

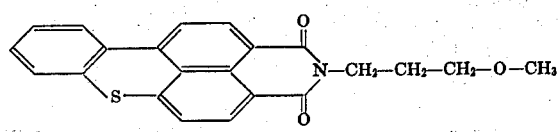

were first pasted with
100 g of cold water and then dispersed with
340 g of hot water and introduced via a sieve in
550 g of a thickening while stirring, which consisted of a mixture of equal parts of a 25% crystal gum thickening and a 10% aqueous solution of a commercial starch ether. Then, there were also introduced, while stirring
25 g of an aqueous solution of
  8 g of m-nitrobenzenesulfonic acid sodium and
  2 g of monosodium phosphate, as well as
45 g of a fixing agent consisting of 37 g of butandiol-(1,4)-pentadecaglycolether-dioleyl ester and 8 g of an addition product of 2 mols of ethylene oxide and 1 mol of β-naphthol.

With the above-mentioned printing paste, a fabric of cellulose-2½-acetate was printed, dried and steamed at a temperature of from 100°-102°C for 8 minutes in a continuous steamer for the fixation of the dyestuff and then finished in the usual manner.

A brilliant, yellow print was obtained in a high yield having excellent fastness properties to light and to wet processing.

EXAMPLE 3

The dyestuff of this example is taught in U.S. Pat. No. 3,502,678 in Example 1.

40 g of the disperse dyestuff of the formula

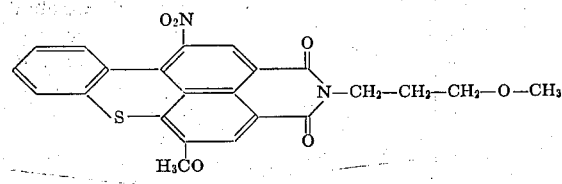

were first pasted with
100 g of cold water and then dispersed with
345 g of boiling water and introduced via a sieve into
500 g of an aqueous thickening while stirring which consisted of a mixture of equal parts of a 25% crystal gum thickening and a 10% aqueous solution of the esterification product of polyglycol (molar weight 2,000) and of stearic acid. Then, there were also added
25 g of an aqueous solution consisting of 8 g of m-nitrobenzenesulfonic acid sodium and 2 g of monosodium phosphate as well as
35 g of a mixture of equal parts of butandiol-(1,4)-pentadecaglycolether-dioleyl. ester and the addition compound of 2 mols of ethylene oxide and 1 mol of β-naphthol.

With this printing paste, a fabric of polyethylene terephthalate fibers was printed, dried and thermofixed at 195°C for 45 seconds on a stenter frame for the fixation of the dyestuff, and then finished in the usual manner. A brilliant pink printing design was obtained in an excellent yield.

EXAMPLE 4

The dyestuff of this example is taught in Swiss Patents Nos. 343,560 and 338,538.

70 g of a powdery disperse dyestuff of the formula

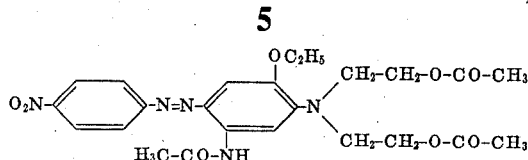
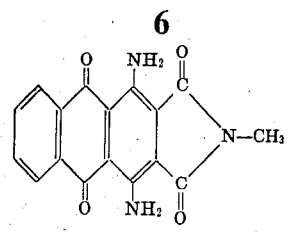

were first pasted with
- 100 g of cold water and then dispersed with
- 290 g of hot water and then introduced via a sieve into
- 500 g of a stock-thickening (having the constitution described in Example 1) while stirring. Then, there were also added
- 40 g of a mixture of 10 g of butandiol-(1,4)-pentadecaglycolether-distearic acid ester and 30 g of the addition product of 4 mols of ethylene oxide and 1 mol of β-naphthol.

With this printing paste, a fabric of cellulose triacetate was printed, dried and thermofixed at 185°C for 60 seconds on a stenter frame for the fixation of the dyestuff and then aftertreated in usual manner by rinsing and soaping.

EXAMPLE 5

40 g of the dyestuff of the formula given in Example 3 were first pasted with
- 100 g of cold water and then dispersed with
- 295 g of hot water and then introduced via a sieve in
- 500 g of a 10% aqueous thickening of a commercial starch ether while stirring. Then, there were also introduced
- 25 g of an aqueous solution of 8 g of m-nitrobenzenesulfonic acid sodium and 2 g of monosodium phosphate as well as
- 40 g of a mixture of 30 g of butandiol-(1,4)-pentadecaglycolether-dioleyl ester and 10 g of the addition product of 2 mols of ethylene glycol and 1 mol of β-naphthol.

With the printing paste so prepared, a fabric of polyethylene terephthalate fibers was printed, dried and steamed at 180°C for 6 minutes in a high-temperature steaming apparatus for the fixation of the dyestuff. After the usual after-treatment a brilliant, pink print was obtained in an optimum yield and with an excellent fastness to light and to wet processing.

The colour yield was similarly good when the fabric was thermofixed on a stenter frame at 185°C for 60 seconds instead of being steamed.

EXAMPLE 6

The dyestuff of this example is taught in U.S. Pat. No. 2,628,963.

40 g of the disperse dyestuff of formula were first pasted with
- 90 g of cold water and then dispersed with
- 250 g of boiling water and introduced via a sieve in
- 600 g of a thickening while stirring, which consisted of a mixture of equal parts of a 25% crystal gum thickening and a 12% aqueous solution of the addition compound of 10,000 mols of ethylene oxide and 1 mol of stearic acid. Then, there were also added
- 25 g of an aqueous solution of 8 g of m-nitrobenzenesulfonic acid sodium and 2 g of monosodium phosphate and
- 35 g of a mixture of 10 g of butandiol-(1,4)-pentadecaglycolether-dioleyl ester and 20 g of the addition product of 4 mols of ethylene oxide and 1 mol of β-naphtol.

A fabric of cellulose triacetate was printed with the printing paste described above on a roller printing machine, dried and steamed at 180°C for 5 minutes on a high-temperature steaming apparatus for the fixation of the dyestuff and then finished in the usual manner.

A limpid, blue print was obtained in an excellent yield having very good properties.

EXAMPLE 7

The dyestuff of this Example is taught in German Patent specification (Auslegeschrift) 1,206,107 in Example 1.

A mixture of 24 g of the disperse dyestuff of formula

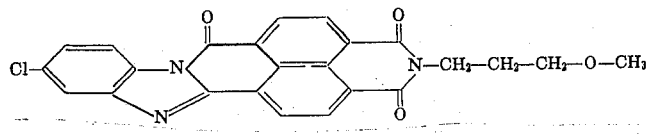

and 16 g of the reactive dyestuff of formula

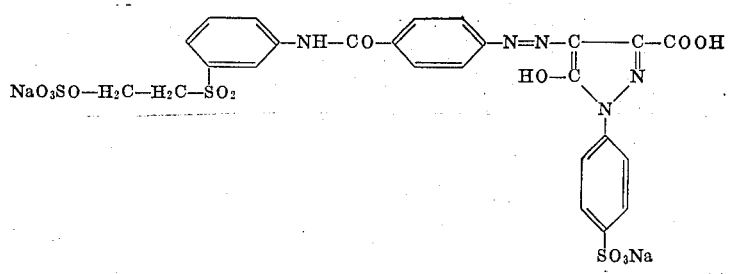

was first pasted with
- 80 g of cold water and then dissolved or dispersed with
- 270 g of boiling water. This dispersion was then introduced in a mixture of
- 350 g of an aqueous 4% sodium alginate thickening and
- 200 g of a 10% aqueous solution of the esterification product of polyethylene glycol (molecular weight: about 2,000 with stearic acid while stirring and then,
- 25 g of an aqueous solution of 8 g of m-nitrobenzenesulfonic acid sodium and 2 g of monosodium phosphate as well as 35 g of butandiol-(1,4)-pentadecaglycolether-dioleyl ester were added. With this printing paste, a mixed fabric of polyethylene terephthalate fibers and mercerized cotton in the mixing ratio of 67 : 33 was printed and dried. Then, the material was thermofixed at 200°C for 20 seconds on a stenter frame for the fixation of the disperse dyestuff and then padded with an alkaline solution containing electrolytes according to the tow-phase-cold-dwell process for the fixation of the reactive dyestuff, which solution had the following composition:

700 cc. of cold water
100 g of calcined sodium sulfate
50 g of anhydrous potassium carbonate
150 g of calcined sodium carbonate
100 g of sodium hydroxide solution at 38° Be (32.5%)

and, after a short passage in the air, it was plaited down and batched up.

After the usual after-treatment, a limpid yellow print was obtained in an optimum colour yield and with excellent shades having very good fastness properties as to light and to wet processing.

A similarly good print was obtained when the reactive dyestuff portion was fixed according to the two-phase-steaming process with a bath having the following composition:

700 cc. of cold water
150 g of calcined sodium carbonate
150 g of sodium chloride or calcined sodium sulfate
50 g of anhydrous potassium carbonate
40 cc. of sodium hydroxide solution of 38° Be (of 32.5%)

and the following steaming was effected continuously at a temperature of from 100° to 102°C for 20 seconds on a gantry ager.

We claim:

1. A process for printing and continuously fixing prints of disperse dyestuffs on fibrous materials of polyester, cellulose-triacetate and cellulose-2½-acetate and mixtures thereof or mixtures with wool, natural or regenerated cellulose fibers or with other synthetic fibers, which process comprises: using a printing paste containing, as fixing auxiliary, 25 to 60 grams per kilogram of printing paste of compounds of the formula (1)

$R_1$—CO—(OC$_2$H$_4$)$_n$—O—C$_4$H$_8$—O—(C$_2$H$_4$O)-$_m$—OC—R$_2$   (1).

wherein $R_1$—CO— and $R_2$—CO— each represents the acyl radicals of linear or branched alkane- or alkene monocarboxylic acids with from 12 to 22 carbon atoms and $n$ and $m$ each is a number of from 4 to 12, alone, or in combination with oxethylated naphtols of the formula (2)

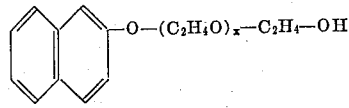

(2)

wherein $x$ is zero or a number of from 1 to 4.

2. A process as claimed in claim 1, for printing fibers of linear polyesters, wherein the fixation is carried out at a temperature of from 180° to 220°C for 30 to 60 seconds with hot air on a stenter frame.

3. A process as claimed in claim 1 for the printing of fibers of linear polyesters, wherein the fixation is carried out at a temperature within the range of from 150° to 190°C for 1 to 8 minutes in a high-temperature steaming apparatus.

4. A process as claimed in claim 1 for the printing of fibers of cellulose-triacetate, wherein the fixation is carried out at a temperature of from 180° to 220°C for 30 to 60 seconds with hot air on a stenter-frame.

5. A process as claimed in claim 1, for the printing of fibers of cellulose-tri-acetate, wherein the fixation is carried out at a temperature of from 150° to 190°C for 1 to 8 minutes in a high-temperature steaming apparatus.

6. A process as claimed in claim 1 for the printing of fibers of cellulose-2½-acetate, wherein the fixation is carried out at a temperature of from 101° to 105°C for 5 to 30 minutes by steaming with saturated steam.

7. A process as claimed in claim 1, wherein the fixing auxiliary agent of formula (1) is the dioleyl ester of the butandiol-(1,4)-pentadecaglycol-ether.

8. A process as claimed in claim 1, wherein the fixing auxiliary agent used is a mixture of a compound of formula

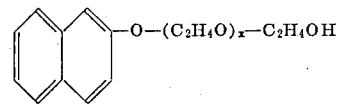

* * * * *